3,251,733
ANTIMICROBIC COMPOSITIONS AND PROCESS FOR PROTECTION OF ORGANIC MATERIALS THEREWITH

Jakob Bindler, Riehen, near Basel, and Ernst Model, Basel, Switzerland, assignors to Geigy Chemical Corporation, Ardsley, N.Y., a corporation of Delaware
No Drawing. Filed June 15, 1962, Ser. No. 202,657
27 Claims. (Cl. 167—30)

The present invention concerns antimicrobic agents and their use for the combatting of fungi and bacteria and for the protection of organic materials and objects from attack by fungi and bacteria and/or injury due to rotting as well as, as industrial product, the organic materials protected by these antimicrobic agents from attack by fungi and bacteria and/or rot.

By "antimicrobic agents" in the present application are meant protective agents against fungi and bacteria which contain active ingredients having fungicidal or fungistatic and also bactericidal or bacteriostatic properties.

It has been found that araliphatic ketones having two benzene nuclei joined together either direct or by way of an oxygen or sulphur atom or by way of a —SO—, —SO$_2$— or —CH$_2$— group, and if they are bound by way of one of the bridging members mentioned there can be present an additional direct linkage of the two benzene nuclei with formation of a 5-membered middle ring, one of the two benzene nuclei being substituted by the chloroacetyl group —COCH$_2$Cl, and this benzene nucleus also contains a hydroxy group as further substituent if it is bound to the second benzene nucleus only by the direct linkage, and the second benzene nucleus is unsubstituted or only contains one substituent i.e. a chlorine atom in any position desired or a nitro or a methylsulphonyl group in p-position to the linking carbon atom, which substituent, if the benzene nuclei are linked together direct or only by way of oxygen, can also be replaced by a chloroacetyl group in the p-position, have excellent antimicrobic, particularly fungicidal or fungistatic and at the same time bactericidal or bacteriostatic properties. In addition they are not very toxic to warm blooded animals and have, in practice, no inflammatory action on the skin or eyes of said animals. They are thus excellently suitable as active substances for combatting fungi and bacteria as well as for the protection of organic materials, from attack by fungi and bacteria and from injury by rot.

The following compounds covered by the formulae given below are embraced by the above general definition of antimicrobic active substances used according to the invention:

(a) Chloroacetylated hydroxydiphenyls of the general formula

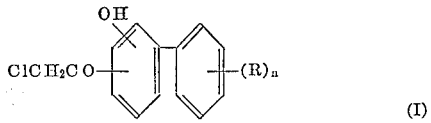

(I)

wherein
$n$ is the number 0 or 1, and
R is a chlorine atom in any position desired or a nitro, methylsulphonyl or monochloroacetyl group in the p-position to the bond linking the nuclei, but R being preferably the monochloroacetyl group in p-position.

(b) Chloroacetylated diphenyl ethers, diphenyl sulphides, diphenyl sulphones, diphenyl sulphoxides and diphenyl methanes of the general formula

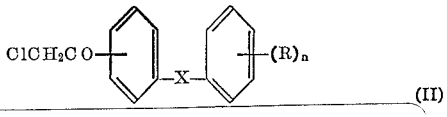

(II)

wherein
X represents an oxygen or sulphur atom or a —SO—, —SO$_2$— or —CH$_2$— group,
R represents a chlorine atom in any position desired or a nitro or methyl sulphonyl group in p-position to the bridging member X and, when X is oxygen, R can also be the monochloroacetyl group in the p-position to the bridging member, and
$n$ is the number 0 or 1.

(c) Chloroacetylated dibenzofurans (diphenylene oxides), dibenzothiophenes (diphenylene sulphides), diphenylene sulphones, diphenylene sulphoxides and fluorenes of the general formula

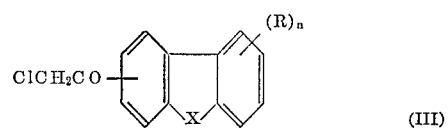

(III)

wherein
X represents an oxygen or sulphur atom or a —SO—, —SO$_2$— or —CH$_2$— group,
R represents a chlorine atom in any position desired or a nitro or methylsulphonyl group, and
$n$ represents the number 0 or 1.

In the latter group, those compounds are preferred in which X is an oxygen atom or the methylene group —CH$_2$—, and $n$ is 0. (Dibenzofuranes and fluorenes.)

Active substances usable according to the invention which have a chloroacetyl group in each of the two benzene nuclei are therefore: bis-chloroacetyl monohydroxydiphenyls and bis-chloroacetyl diphenyl ethers.

Up to now such araliphatic ketones have been used in particular as starting materials or intermediates in the production of dyestuffs and pharmaceuticals etc. Nothing, however, has been known with regard to a bactericidal and/or fungicidal action of these compounds.

Those of the active substances to be used according to the invention can easily be produced by known methods.

They are obtained, for example, from diphenyls, diphenyl ethers, diphenyl sulphides, diphenyl methanes, dibenzofurans, fluorenes etc. possibly substituted as defined, by reaction with 1 or 2 mols of chloroacetyl chloride in the presence of AlCl$_3$ according to Friedel-Crafts.

Also, on reacting diphenyl ether, diphenyl methane, dibenzofuran or fluorene with acetyl chloride according to Friedel-Crafts, first the acetyl group can be introduced into the molecule and then it can be chlorinated.

Chloroacetyl diphenyl sulphones and chloroacetyl diphenyl sulphoxides can be produced by oxidizing the acetyl-diphenyl sulphides produced above according to Friedel-Crafts and then chlorinating the acetyl group.

In general the active substances according to the invention are colorless to pale yellowish colored bodies which can be purified either by distillation under reduced pressure or by recrystallization. They are insoluble in water but are easily soluble in the usual organic solvents. This solubility in organic solvents which are used for the so-called dry cleaning of fabrics, enable the active substances to be applied as organic solutions in the form of sprays or dry cleaners in the presence of neutral wetting and cleansing agents. In addition, the active substances can be mixed into paper treatment liquors or printing thickeners made from starch or cellulose derivatives or they can be used for the impregnation of wood. Also in objects made of synthetic resin such as, e.g. polyvinyl chloride films etc. as well as in lacquers and paints which contain, e.g., casein or synthetic resin, an effective protection from attack by fungi and bacteria is obtained with the substances usable according to the invention.

The following compounds can be used, for example, as antimicrobic active substances according to the invention:

5-chloroacetyl-2-hydroxydiphenyl,
3,4′-bis-chloroacetyl-4-hydroxydiphenyl,
5,4′-bis-chloroacetyl-2-hydroxydiphenyl,
4-chloroacetyl-diphenyl ether,
4-chloroacetyl-4′-chlorodiphenyl ether,
4-chloroacetyl-3′-chlorodiphenyl ether,
4-chloroacetyl-2′-chlorodiphenyl ether,
4-chloroacetyl-4′-methylsulphodiphenyl ether,
4-chloroacetyl-4′-nitrodiphenyl ether,
4,4′-bis-chloroacetyl-diphenyl ether,
4-chloroacetyl-diphenyl sulphide,
4-chloroacetyl-4′-chlorodiphenyl sulphide,
4-chloroacetyl-diphenyl sulphone,
4-chloroacetyl-diphenylmethane,
Monochloroacetyl-fluorene,
Chloroacetyl-dibenzofuran (chloroacetyl-diphenylene oxide).

These and other active substances to be used according to the invention are distinguished by very slight toxicity to warm blooded animals and cause no irritation to eyes and skin of the animals. These active substances can also be used in practically neutral synthetic washing and cleansing agents in solid form such as tablets or bars, which agents contain, for example, non-ionogenic products or fatty acid condensation products as wash active component. The active substances according to the invention have a good action both against bacteria as well as against fungi and they are distinguished in particular by their surprisingly broad range of action. The bactericidal action covers both gram positive as well as gram negative bacteria. Another advantage is their colorlessness or only slight color which enables them to be used for many purposes for which the known strongly colored compounds are not suitable.

The antimicrobic active substance is applied to the organic material to be protected either by simply admixing or incorporating the active substance or spraying or impregnating with solutions or suspensions of the active substance. In general, contents of 5 to 20 g. of active substance per liter of treatment liquor are sufficient for an effective protection of the sprayed or impregnated material from attack by fungi and bacteria, rot or formation or mildew spots. Organic material with a content of 0.5 to 2% active substance, calculated on the weight of the material, is generally effectively and lastingly protected against attack by fungi. Organic materials to be protected are mainly cellulose materials such as cellulose, wood, paper, materials having a synthetic resin basis and also lacquers and paints. However, also other organic substances which tend to mould or rot such as leather, vegetable or animal mucilages and jells, permanent sizings made from polyvinyl compounds etc. can be protected.

The good activity of the active substances to be used according to the invention against bacteria and fungi can be seen from the laboratory test described below:

By producing solutions of varying concentration of the active substance to be tested in ethylene glycol monomethyl ether (methyl Cellosolve) and adding 1.25% of these methyl Cellosolve solutions to 20 ml. of agar, nutrient mediums are produced which contain the following 8 final concentrations of active substance in p.p.m. (=parts of active substance per $10^6$ parts substratum): 300; 100; 30; 10; 3; 1; 0.3 and 0.1.

After the agar nutrient medium has solidified, 24 hour old cultures of the following bacteria and fungi are inoculated:

Bacteria:
*Staphylococcus aureus* SG 511
*Escherichia coli* 96
*Bacillus mesentericus*
*Sarcina lutea*

Fungi:
*Aspergillus niger.*
*Penicillum expansum.*
*Fusarium oxysporum.*
*Candida ablicans.*

The dishes inoculated with bacteria are incubated for 48 hours at 37° whilst the nutrient mediums inoculated with fungi are kept for 5 days at 28° C.; the growth of the organisms on the Agar medium is then visually judged. The following table shows the result of the test; the lowest concentration of active substance in p.p.m. (=parts of active substance per 1 million parts of carrier substance) is given with which a complete inhibition of growth could be observed.

The following active substances were tested:

(I) 4-chloroacetyl diphenyl ether,
(II) 4-chloroacetyl-4′-chlorodiphenyl ether,
(III) 4-chloroacetyl-3′-chlorodiphenyl ether,
(IV) 4-chloroacetyl-2′-chlorodiphenyl ether,
(V) 4-chloroacetyl-4′-nitrodiphenyl ether,
(VI) 4-chloroacetyl diphenyl sulphide,
(VII) 4-chloroacetyl diphenyl sulphone,
(VIII) 4-chloroacetyl diphenylmethane,
(IX) Chloroacetyl-dibenzofuran (chloroacetyl diphenylene oxide),
(X) 4-chloroacetyl-4′-methylsulphodiphenyl ether,
(XI) 4,4′-bis-chloroacetyl diphenyl ether,
(XII) 2-hydroxy-5-chloroacetyl diphenyl,
(XIII) 2-hydroxy-5,4′-bis-chloroacetyl diphenyl;

TABLE

| Substance | Bacteria | | | | Fungi | | | |
|---|---|---|---|---|---|---|---|---|
| | Staph. aur. | Esch. coli | Bac. mesent | Sarc. lut. | Asp. nig. | Pen. exp. | Fus. oxysp. | Cand. alb. |
| I | 3 | 3 | 10 | 1 | 3 | 10 | 10 | 10 |
| II | 0.3 | 3 | 1 | 0.3 | 10 | 1 | 10 | 10 |
| III | 0.3 | 30 | 3 | 0.3 | 30 | 30 | 3 | 3 |
| IV | 3 | 30 | 3 | 0.3 | 30 | 30 | 3 | 30 |
| V | 3 | 3 | 3 | 3 | 3 | 3 | 3 | 3 |
| VI | 1 | 10 | 1 | 1 | 10 | 3 | 3 | 3 |
| VII | 3 | 30 | 3 | 3 | 300 | 10 | 10 | 10 |
| VIII | 1 | 10 | 3 | 1 | 10 | 3 | 3 | 3 |
| IX | 0.3 | 3 | 3 | 3 | 300 | 3 | 3 | 3 |
| X | 3 | 30 | 30 | 3 | 300 | 30 | 30 | 30 |
| XI | 1 | 1 | 3 | 1 | >300 | 1 | 3 | 3 |
| XII | 3 | 30 | 30 | 3 | 300 | 10 | 30 | 30 |
| XIII | 1 | 10 | 3 | 1 | 300 | 3 | 30 | 10 |

From the above table the uniformly wide action spectrum and the excellent action of the substances used according to the invention, which also covers gram-negative bacteria such as, e.g., *Escherichia coli*, can be seen. The active substances of general Formulae I to III used according to the invention can also be used in combination with other fungicidal and/or bactericidal substances, e.g., with halogenated salicylic acid alkylamides and anilides, halogenated diphenyl ureas, halogenated benzoxazolones, polychlorohydroxy-diphenylmethanes, halogenated dioxy-diphenyl sulphides, etc.

On using the active substances according to the invention simultaneously with other bactericidal or fungicidal compounds, often a better action can be determined than would have been expected from the sum of the two effects (synergism).

In the fungistatic test, mixtures of 1-lauryl-2-imino-imidazolidine hydrochloride with many of the active substances according to the invention, show a clear synergistic increase of action. The same is true of mixtures of the active substances according to the invention with 3,4,4'-trichloro-2-hydroxydiphenyl urea.

In the bacteriostatic test, mixtures of active substances according to the invention with known bacteriostatica such as 2-hydroxy-3,5-dichlorobenzoic acid-3',4'-dichloroanilide, hexachlorophene, 3-trifluoromethyl-4,4'-dichlorodiphenyl urea etc. also show a clear synergistic increase of action.

Where not otherwise stated, in the following application examples parts are given as parts by weight. Percentages are to be understood as percentages by weight and the temperatures are in degrees centigrade.

Example 1.—Paint 130 parts of an emulsion paint having a 75% content of solid substances and consisting of:

| | |
|---|---|
| Parts of chalk | 36 |
| Parts of titanium dioxide | 9 |
| Parts of Mowilite DO 25 (Hoechst) | 22.5 |
| Parts of Belloid TD | 0.5 |
| Parts of pigment paste of about 60% solid component | 10 |
| Parts of water ad 100 | | are mixed with 8 parts of a 25% stock solution of 4-chloroacetyl-diphenyl sulphone (I) or 4-chloroacetyl-4'-chlorodiphenyl sulphide (II) or 4-chloroacetyl-4'-nitrodiphenyl ether (III), ethylene glycol monomethyl ether and dimethyl formamide 1:1 serving as solvents. This produces a paint which contains 2% of active substance calculated on the solid content. In the same way, using 1.6 or 0.32 part of active substances, paints are produced which contain 0.4 and 0.08% respectively of active substance calculated on the solid content.

Pieces of cardboard made from wood pulp of about 1 mm. thickness and 6 x 6 cm. square are so painted on both sides that, per sq. meter, 200 grams of each of the 3 previously prepared mixtures are evenly applied (=1.44 g./72 cm.²). The cardboard pieces are dried for some days and then subjected to the biological test in the following way:

A pumice stone plate of 6 x 6 x 0.5 cm. is laid in a petri dish of 10 cm. diameter and covered with a 6 x 6 cm. glass plate. The pumice stone plate is saturated with distilled water. The piece of cardboard to be tested is laid on the glass plate and inoculated with 1 ml. of a suspension of spores of the following composition:

Inoculum: 10 ml. of Czapek solution are added to 14-day-old slant agar culture of the fungus *Trichoderma viride* and the surfaces of the culture is carefully scraped and suspended; it is then filtered through fiberglass the filtrate is used as inoculum. The petri dishes are then closed and the culture is incubated for 10 days at 28° C. The development of a fungi growth is then estimated:

RESULTS

| Active substance | 2% | Concentrations of active substance | |
|---|---|---|---|
| | | 0.4% | 0.08% |
| I | No growth | Slight growth | Moderate growth. |
| II | do | do | Strong growth. |
| III | do | do | Slight growth. |
| Control without active substance. | Strong growth | Strong growth | Strong growth. |

Example 2.—Plasticizer for synthetic resins

The active substance 4,4'-bis-chloroacetyl-diphenyl ether is dissolved in suitable concentrations in ethylene glycol monomethyl ether:

4 parts of this solution are mixed with 5 parts of dioctyl sebacate. The insensitivity of the plasticizer so obtained to fungal and bacterial attack is tested as follows: This plasticizer mixture is added to 91 parts of nutrient agar and the agar mixture is poured into plates. After solidifying, inoculation is made with a 14-day-old culture of *Aspergillus oryzae* or with a 24-hour-old culture of *Escherichia coli* 96. The inoculum is obtained as follows:

10 ml. of physiological sodium chloride solution are added to each of 14-day-old slant agar cultures of *Aspergillus oryzae* or of 24-hour-old slant agar cultures of *Escherichia coli* 96. The surface of the cultures is carefully scraped and suspended. The suspension is then filtered through fiberglass and the filtrate is used as inoculum.

The nutrient agar used for *Aspergillus oryzae* is Sabouraud-Maltose:mineral salt agar 1:20. If *Escherichia coli* 96 is inoculated, the nutrient agar is nutrient agar:mineral salt agar=1:20.

The ethylene glycol monomethyl ether solutions contain so much active substance that the concentrations, calculated on the plasticizer, are 2.0%, 0.4% and 0.08%. The plates inoculated with *Aspergillus oryzae* are left for 10 days at 28° C., whilst those inoculated with *Escherichia coli* 96 are kept for 48 hours at 37° C. The development of the organisms on the agar surface is then judged.

TABLE

| Concentrations, percent | *Aspergillus oryzae* | *Escherichia coli* 96 |
|---|---|---|
| 2.0 | No growth | No growth. |
| 0.4 | do | Do. |
| 0.08 | Growth | Do. |

Example 3.—Application to cotton

Active substance I=4-chloroacetyl-3'-chloro-diphenyl ether is dissolved in ethylene glycol monomethyl ether in the concentrations of (a) 1.04 g./l. (grams/litre)
(b) 5.2 g./l.
(c) 26.0 g./l.

and active substance II=4-chloroacetyl-diphenylmethane is also dissolved in the same solvent in concentrations of (d) 1.04 g./l.
(e) 5.2 g./l.
(f) 26.0 g./l.

Cotton cambric is dipped for 10 seconds at room temperature in the solution (a), (b), or (c) or in (d), (e) or (f) (liquor ratio 1:10) and the fabric is then wrung out through a mangle to an increase in weight of 38%. In this way, the fabric is impregnated with the following amounts of active substance, calculated on the weight of the fiber:

| | Percent |
|---|---|
| (a) or (d) | 0.04 |
| (b) or (e) | 0.2 |
| (c) or (f) | 1.0 |

The fabric is dried in the air and, after complete evaporation off of the solvent, subjected to biological test.

A similar fabric is treated in the same way but only in the solvent without the addition of active substance and this serves as control.

(1) *Growth test.*—Circles of 40 mm. diameter of the fabric are placed on an agar plate which has been previously inoculated with *Aspergillus niger* and the plate is kept for 10 days at 28° C. and 90% relative humidity. At the end of this time the fungus growth is judged which led to the results given in the table for the corresponding impregnations.

Circles each of 38 mm. diameter are cut from the same pieces of material (a), (b) and (c) or (d), (e) or (f) and the control and used for the following rotting test:

(2) *Chaetomium test.*—Two circular patterns of each material are placed on a suitable mineral salt agar plate and inoculated with 1 ml. of a freshly prepared suspension of spores of a 10-day-old culture of *Chaetomium globosum*. The plates are left for 10 days at 28° C. and 90% relative humidity, then the patterns are cleaned, conditioned and their resistance to perforation is tested. The results are expressed in percent of the remaining mechanical solidity calculated on the original solidity before the test. The result obtained by this process are given in the table.

(3) *Earth burial test.*—Two circular patterns of each of the treated fabrics are laid in 500 ml. jam jars, which were then filled with compost earth of the following composition: 50% of compost, 30% cow dung and 20% sand. The moisture of the earth was 30%. The samples were left for 14 days at 28° C. They were then cleaned and the resistance to perforation was tested. The results are expressed in percent of the remaining mechanical solidity, calculated on the original solidity before the test. The results given in the table were obtained by this process.

RESULTS

| | Growth test (growth on test sample) | Chaetomium test (resistance to perforation of test sample, percent) | Earth Burial test (resistance to perforation of test sample, percent) |
| --- | --- | --- | --- |
| Treatment with solvent alone. | Strong | 0 | 0 |
| Active substance: | | | |
| (a) | None | 100 | 16 |
| (b) | do | 100 | 94 |
| (c) | do | 100 | 100 |
| (d) | Weak | 87 | 0 |
| (e) | do | 100 | 74 |
| (f) | do | 100 | 92 |

*Example 4.—Application to wool*

Active substance I=4-chloroacetyl-3'-chlorodiphenyl ether is dissolved in ethylene glycol monoethyl ether in the concentrations of (a) 8.0 g./l.
(b) 40.0 g./l.

and active substance II=4-chloroacetyl-diphenylmethane is also dissolved in ethylene glycol monoethyl ether in the concentrations (c) 8.0 g./l.
(d) 40.0 g./l.

Wool muslin is dipped for 10 seconds at room temperature in the solution (a) or (b) or in (c) or (d) (liquor ratio 1:10) and squeezed out through a mangle to a 25% increase in weight. In this way, the fiber is impregnated with the following amounts of active substance, calculated on the weight of the fiber:

Percent
(a) or (c) _____ 0.2
(b) or (d) _____ 1.0

The fabric is dried in the air and after complete evaporation off of the solvent, subjected to biological test.

A similar fabric is treated in the same way but only in solvent without the addition of active substance and serves as a control in the tests.

Circular patterns are cut from the treated fabrics (a) or (b) or from (c) or (d), each pattern having 20 mm. diameter. These are placed on nutrient agar plates to which 50 p.p.m. of potassium tellurite have been added and which have been inoculated with *Bacillus mesentericus* and the plates are then left for 48 hours at 37° C. After that time, the growth on the fabric is judged visually.

RESULTS

| | Growth on the sample of *Bacillus mesentericus* |
| --- | --- |
| Treatment with solvents alone | Strong. |
| Active substance I: | |
| (a) | Moderate. |
| (b) | None. |
| Active substance II: | |
| (c) | Moderate. |
| (d) | None. |

What is claimed is:

1. An antimicrobic composition comprising as an active ingredient a compound of the formula

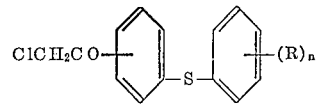

wherein *n* is an integer from zero to one and R is a member selected from the group consisting of Cl, p-NO₂ and p-methylsulphonyl, and an inert carrier.

2. An antimicrobic composition comprising as an active ingredient a compound of the formula

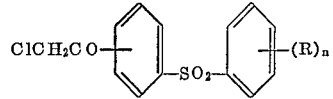

wherein *n* is an integer from zero to one and R is a member selected from the group consisting of Cl, p-NO₂ and p-methylsulphonyl, and an inert carrier.

3. An antimicrobic composition comprising as an active ingredient a compound of the formula

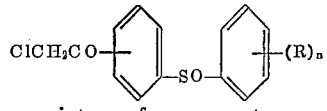

wherein *n* is an integer from zero to one and R is a member selected from the group consisting of Cl, p-NO₂ and p-methylsulphonyl, and an inert carrier.

4. An antimicrobic composition comprising as an active ingredient a compound of the formula

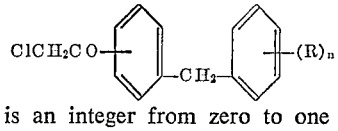

wherein *n* is an integer from zero to one and R is a member selected from the group consisting of Cl, p-NO₂ and p-methylsulphonyl, and an inert carrier.

5. An antimicrobic composition comprising as an active ingredient a compound of the formula

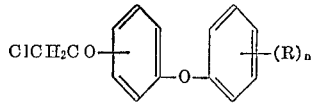

wherein $n$ is an integer from zero to one and R is a member selected from the group consisting of Cl, p-NO$_2$ p-methylsulphonyl, and p-monochloroacetyl, and an inert carrier.

6. A textile material which has been protected from attack by fungi and bacteria by being coated with the antimicrobic composition according to claim 5.

7. An aqueous emulsion paint containing as an active ingredient a compound of the formula

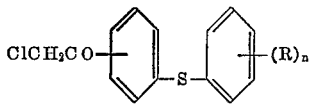

wherein $n$ is an integer from zero to one and R is a member selected from the group consisting of Cl, p-NO$_2$ and p-methylsulphonyl, and an inert carrier.

8. An aqueous emulsion paint containing as an active ingredient a compound of the formula

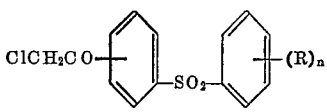

wherein $n$ is an integer from zero to one and R is a member selected from the group consisting of Cl, p-NO$_2$ and p-methylsulphonyl, and an inert carrier.

9. An aqueous emulsion paint containing as an active ingredient a compound of the formula

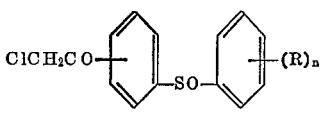

wherein $n$ is an integer from zero to one and R is a member selected from the group consisting of Cl, p-NO$_2$ and p-methylsulphonyl, and an inert carrier.

10. An aqueous emulsion paint containing an as active ingredient a compound of the formula

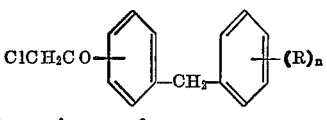

wherein $n$ is an integer from zero to one and R is a member selected from the group consisting of Cl, p-NO$_2$ and p-methylsulphonyl, and an inert carrier.

11. An aqueous emulsion paint containing as an active ingredient a compound of the formula

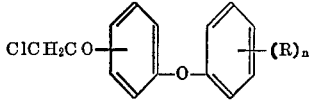

wherein $n$ is an integer from zero to one and R is a member selected from the group consisting of Cl, p-NO$_2$ p-methylsulphonyl, and p-monochloroacetyl, and an inert carrier.

12. An composition comprising a plasticizer and as active ingredient a compound of the formula

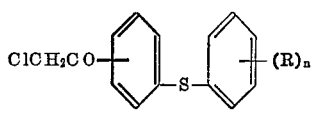

wherein $n$ is an integer from zero to one and R is a member selected from the group consisting of Cl, p-NO$_2$ and p-methylsulphonyl, and an inert carrier.

13. A composition comprising a plasticizer and as active ingredient a compound of the formula

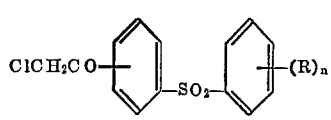

wherein $n$ is an integer from zero to one and R is a member selected from the group consisting of Cl, p-NO$_2$ and p-methylsulphonyl, and an inert carrier.

14. A composition comprising a plasticizer and as active ingredient a compound of the formula

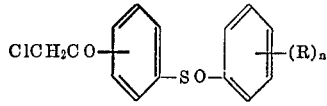

wherein $n$ is an integer from zero to one and R is a member selected from the group consisting of Cl, p-NO$_2$ and p-methylsulphonyl, and an inert carrier.

15. A composition comprising a plasticizer and as active ingredient a compound of the formula

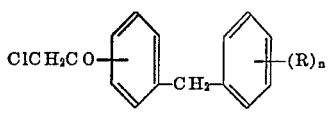

wherein $n$ is an integer from zero to one and R is a member selected from the group consisting of Cl, p-NO$_2$ and p-methylsulphonyl, and an inert carrier.

16. A composition comprising a plasticizer and as active ingredient a compound of the formula

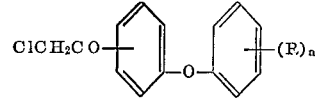

wherein $n$ is an integer from zero to one and R is a member selected from the group consisting of Cl, p-NO$_2$, p-methylsulphonyl, and p-monochloroacetyl, and an inert carrier.

17. A method for protecting and disinfecting a site from fungi and bacteria which comprises applying to such site a disinfecting composition comprising as active ingredient a compound of the formula

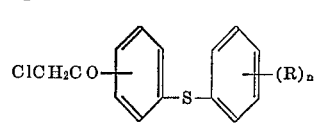

wherein $n$ is an integer from zero to one and R is a member selected from the group consisting of Cl, p-NO$_2$ and p-methylsulphonyl, and an inert carrier.

18. A method for protecting and disinfecting a site from fungi and bacteria which comprises applying to such site a disinfecting composition comprising as active ingredient a compound of the formula

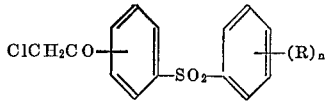

wherein $n$ is an integer from zero to one and R is a member selected from the group consisting of Cl, p-NO$_2$ and p-methylsulphonyl, and an inert carrier.

19. A method for protecting and disinfecting a site from fungi and bacteria which comprises applying to such site a disinfecting composition comprising as active ingredient a compound of the formula

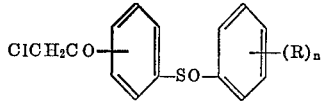

wherein $n$ is an integer from zero to one and R is a member selected from the group consisting of Cl, p-NO$_2$ and p-methylsulphonyl, and an inert carrier.

20. A method for protecting and disinfecting a site from fungi and bacteria which comprises applying to such site a disinfecting composition comprising as active ingredient a compound of the formula

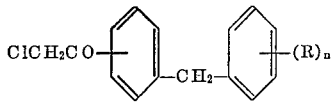

wherein $n$ is an integer from zero to one and R is a member selected from the group consisting of Cl, p-$NO_2$ and p-methylsulphonyl, and an inert carrier.

21. A method for protecting and disinfecting a site from fungi and bacteria which comprises applying to such site a disinfecting composition comprising as active ingredient a compound of the formula

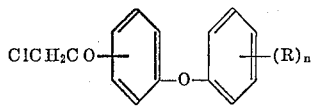

wherein $n$ is an integer from zero to one and R is a member selected from the group consisting of Cl, p-$NO_2$, p-methylsulphonyl, and p-monochloroacetyl, and an inert carrier.

22. An antimicrobic composition comprising as an active ingredient 4-chloroacetyl diphenyl ether and an inert carrier.

23. An antimicrobic composition comprising as an active ingredient 4-chloroacetyl-4'-chlorodiphenyl ether and an inert carrier.

24. An antimicrobic composition comprising as an active ingredient 4-chloroacetyl-3'-chlorodiphenyl ether and an inert carrier.

25. An antimicrobic composition comprising as an active ingredient 4-chloroacetyl diphenylmethane and an carrier.

26. A method for disinfecting and protecting a site from fungi and bacteria which comprises applying to such site a disinfecting composition comprising as an active ingredient the compound 4-chloroacetyl diphenyl ether.

27. A method for disinfecting and protecting a site from fungi and bacteria which comprises applying to such site a disinfecting composition comprising as an active ingredient the compound 4-chloroacetyl-4'-chlorodiphenyl ether.

No references cited.

LEWIS GOTTS, *Primary Examiner.*

JULIAN S. LEVITT, RICHARD L. HUFF,
*Assistant Examiners.*